US012539627B2

(12) United States Patent
Douglas et al.

(10) Patent No.: US 12,539,627 B2
(45) Date of Patent: Feb. 3, 2026

(54) LOCKING FOLDABLE KNIFE WITH DOUBLE LOCKING MECHANISM

(71) Applicant: Good Sportsman Marketing, LLC, Irving, TX (US)

(72) Inventors: Dillon Douglas, Henderson, NV (US); Thomas Rucci, Henderson, NV (US)

(73) Assignee: Good Sportsman Marketing, LLC, Irving, TX (US)

(*) Notice: Subject to any disclaimer, the term of this patent is extended or adjusted under 35 U.S.C. 154(b) by 688 days.

(21) Appl. No.: 17/901,178

(22) Filed: Sep. 1, 2022

(65) Prior Publication Data

US 2022/0410415 A1 Dec. 29, 2022

Related U.S. Application Data

(63) Continuation-in-part of application No. 17/567,825, filed on Jan. 3, 2022, now Pat. No. 11,883,967.

(60) Provisional application No. 63/161,911, filed on Mar. 16, 2021.

(51) Int. Cl.
*B26B 1/04* (2006.01)

(52) U.S. Cl.
CPC .................................... *B26B 1/048* (2013.01)

(58) Field of Classification Search
CPC ........ B26B 1/00; B26B 1/02; B26B 1/04–048
See application file for complete search history.

(56) References Cited

U.S. PATENT DOCUMENTS 4,451,982 A 6/1984 Collins
5,737,841 A 4/1998 McHenry et al.
6,145,202 A 11/2000 Onion
6,378,214 B1 * 4/2002 Onion .................... B26B 1/048 30/160
6,751,868 B2 6/2004 Glesser
7,059,053 B2 6/2006 Sakai
7,062,856 B2 * 6/2006 Moser ........................ B26B 1/04 30/158
7,340,837 B1 3/2008 Busse
7,469,476 B2 12/2008 Demko
7,581,321 B2 * 9/2009 Kain ........................ B26B 1/048 30/155
7,941,927 B1 5/2011 Demko
8,458,913 B2 6/2013 Lo
9,327,413 B2 * 5/2016 Sakai ...................... B26B 1/042
9,751,221 B1 9/2017 Aylsworth
9,751,222 B2 9/2017 Kao
10,160,122 B2 12/2018 Busse
10,307,916 B2 6/2019 Hinderer
10,632,632 B1 * 4/2020 Demko .................. B26B 1/048

(Continued)

OTHER PUBLICATIONS

Office Action in U.S. Appl. No. 18/538,788 mailed Aug. 25, 2025, 11-pgs.

*Primary Examiner* — Adam J Eiseman
*Assistant Examiner* — Richard D Crosby, Jr.
(74) *Attorney, Agent, or Firm* — Cabello Hall Zinda, PLLC

(57) ABSTRACT

A locking foldable knife comprises a locking assembly that reliably locks a blade in an extended and folded position. The locking assembly utilizes the surface area of a shaped peripheral edge at a second end of a blade, together with, confirming structures of a locking bar, and one or more stops to reliably lock a blade in an extended position. The locking foldable knife may be doubly secured with a switch lock that prevents inadvertent unlocking.

20 Claims, 12 Drawing Sheets

(56) References Cited

U.S. PATENT DOCUMENTS

| | | | |
|---|---|---|---|
| 10,792,823 | B2 | 10/2020 | Busse |
| 11,130,246 | B2 | 9/2021 | Busse |
| 11,220,013 | B1 | 1/2022 | Valerio |
| 11,298,837 | B2 | 4/2022 | Hangartner |
| 2008/0040931 | A1 | 2/2008 | Demko |
| 2010/0192381 | A1 | 8/2010 | Sakai |
| 2012/0159789 | A9 | 6/2012 | Frazer |
| 2015/0239134 | A1 | 8/2015 | Duey |
| 2016/0121493 | A1 | 5/2016 | Ikoma |
| 2016/0354936 | A1 | 12/2016 | Busse et al. |

* cited by examiner

LOCKING FOLDABLE KNIFE WITH DOUBLE LOCKING MECHANISM

CROSS-REFERENCE TO RELATED APPLICATION

This application is a continuation-in-part of U.S. patent application Ser. No. 17/567,825, filed Jan. 3, 2022, which claims the benefit of U.S. Provisional Patent No. 63/161,911, filed Mar. 16, 2021.

BACKGROUND OF THE INVENTION

Field of the Invention

The invention relates to folding knives and in particular to a locking foldable knife with a plurality of locking mechanisms.

Related Art

Folding knives are often desirable because they provide a blade that can be extended for use and can be folded for storage and carrying. This provides convenience as well as utility. A variety of locking mechanisms have been developed to prevent the blade from folding while extended for use.

For example, U.S. Pat. Nos. 4,451,982 and 7,914,927 describe a sliding member that extends to engage and lock a blade in position. U.S. Pat. Nos. 6,761,868 and 5,737,841 describe a spherical or cylindrical member that slides to engage and lock a blade in position. U.S. Pat. No. 10,632,632 and U.S. Patent Publication No. 2008/0040931 describe a pivoting member that pivots to engage and lock a blade in position.

U.S. Pat. No. 9,751,222 discloses a lockback folding knife with a safety mechanism including lockback bar with a safety switch that rotates to engage and lock a blade in position. U.S. Pat. No. 11,298,837 discloses a folding knife with a locking spring that engages a blade to secure the blade. U.S. Patent Publication No. 2016/0121493 discloses a folding knife having a cross-bolt that is laterally movable to prevent rotation of a blade.

From the discussion that follows, it will become apparent that the present invention addresses the deficiencies associated with the prior art while providing numerous additional advantages and benefits not contemplated or possible with prior art constructions.

SUMMARY OF THE INVENTION

A locking foldable knife is disclosed herein. As will be described further below, the locking foldable knife reliably locks a blade in an extended position, a folded position, or both through its locking assembly. The locking assembly comprises a variety of shaped structures to provide the surface area to reliably lock a blade in position.

Various embodiments of a locking foldable knife are disclosed. For instance, in one exemplary embodiment, a locking foldable knife comprises a blade having a first end and a second end. The first end comprises one or more cutting edges and the second end comprises a shaped periphery. The shaped periphery comprises a plurality of locking edges and at least one interstitial edge therebetween.

The locking foldable knife also comprises a handle with the blade being rotatably mounted to the handle at its second end, a stop secured to the handle, and a locking bar comprising a notched portion.

The locking bar is movable along an axis between an extended position and a retracted position relative to the handle. A portion of the locking bar at the distal end of the locking bar is received between at least one of the plurality of locking edges and the stop when the locking bar is in the extended position, and the locking bar is disengaged from the plurality of locking edges when the locking bar is in the retracted position.

A lock movable between a locked position and an unlocked position relative to the locking bar is also included. A portion of the lock is received within the notched portion when the lock is in the locked position, and the lock is disengaged from the notched portion when the lock is in the unlocked position.

A hold may engage the lock at a first location when the lock is in the locked position and at a second location when the lock is in the unlocked position. The lock may comprise a first detent at the first location and a second detent at the second location. The hold may comprise a resilient member biased to engage the first detent when the lock is in the locked position and the second detent when the lock is in the unlocked position.

It is noted that the notched portion may extend substantially perpendicular to the axis. In addition, the lock may be movable substantially perpendicular to the axis. The lock may comprise a user engageable switch at an exterior surface of the handle and a member extending inwardly from the exterior surface.

In another exemplary embodiment, a locking assembly for a foldable knife comprising a handle and a blade is disclosed with the locking assembly comprising one or more stops secured to the handle and a locking bar comprising a notched portion. The locking bar is movable along an axis between an extended position and a retracted position relative to the handle. A portion of the locking bar at the distal end of the locking bar is received between a portion of the blade and the stops when the locking bar is in the extended position, and the locking bar is disengaged from at least one of the stops when the locking bar is in the retracted position.

A lock movable between a locked position and an unlocked position relative to the locking bar is also provided. A portion of the lock is received within the notched portion when the lock is in the locked position, and the lock is disengaged from the notched portion when the lock is in the unlocked position.

A hold that engages the lock at a first location when the lock is in the locked position and engages the lock at a second location when the lock is in the unlocked position may be provided in some embodiments. The lock may comprise a first detent at the first location and a second detent at the second location. The hold may comprise a resilient member biased to engage the first detent when the lock is in the locked position and the second detent when the lock is in the unlocked position.

It is noted that the notched portion may extend substantially perpendicular to the axis and the lock may be movable substantially perpendicular to the axis. In addition, the lock may comprise a user engageable switch at an exterior surface of the handle and a member extending inwardly from the exterior surface.

Various methods relating to the locking foldable knife are disclosed herein as well. In one exemplary embodiment, a method for providing a locking foldable knife is provided with such method comprising rotatably mounting a proximal end of a blade to a handle of the locking foldable knife, attaching one or more stops to the handle, and movably mounting a locking bar comprising a notched portion relative to the handle.

The locking bar is movable along an axis between an extended position and retracted position. A portion of the locking bar at the distal end of the locking bar is received between a portion of the blade and the stops when the locking bar is in the extended position, and the locking bar is disengaged from at least one of the stops when the locking bar is in the retracted position.

The method also includes movably mounting a lock relative to the locking bar. The lock is movable between a locked position and an unlocked position relative to the locking bar. A portion of the lock is received within the notched portion when the lock is in the locked position, and the lock is disengaged from the notched portion when the lock is in the unlocked position.

Similar to above, a hold that engages the lock at a first location when the lock is in the locked position and engages the lock at a second location when the lock is in the unlocked position may be provided as well. The lock may comprise a first detent at the first location and a second detent at the second location. The hold may comprise a resilient member biased to engage the first detent when the lock is in the locked position and the second detent when the lock is in the unlocked position. In addition, the notched portion may extend substantially perpendicular to the axis, the lock may be movable substantially perpendicular to the axis, or both.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

Description

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As will become apparent from the disclosure herein, the locking foldable knife provides a locking assembly to reliably lock its blade in position. The locking assembly reduces the risk of accidental closure while also maintaining the convenience of a folding knife.

Figure 1:
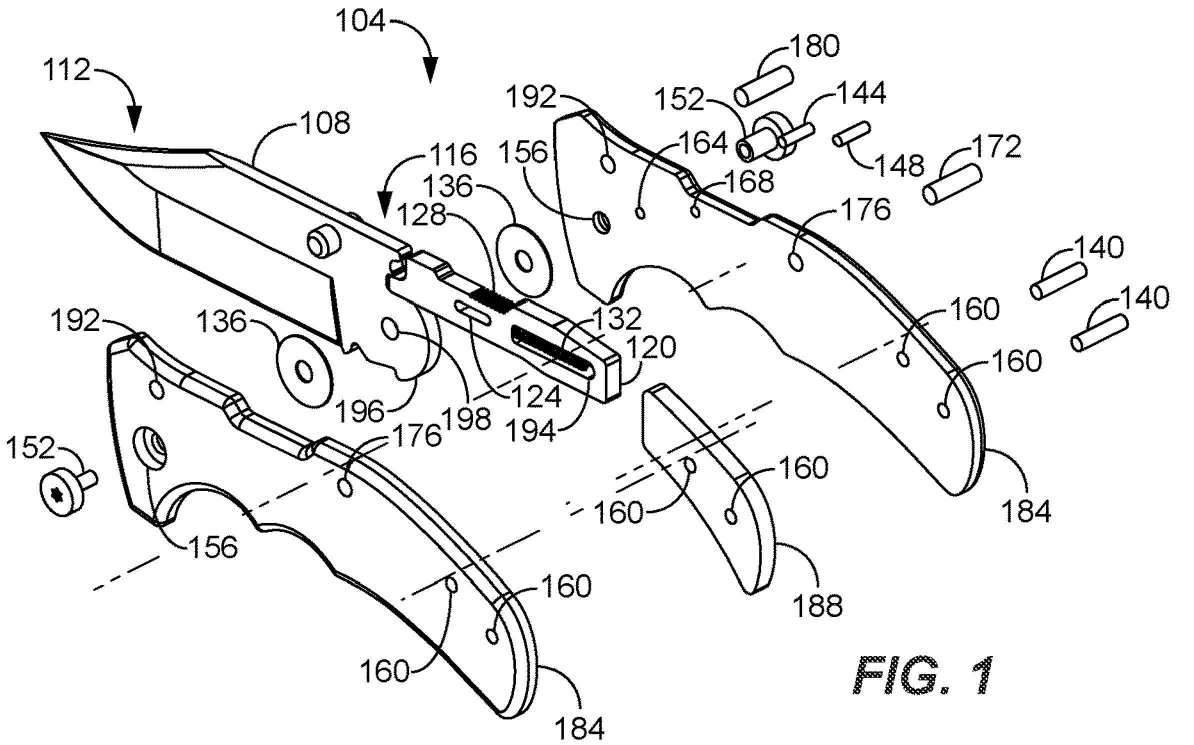
FIG. 1 is an exploded view of an exemplary locking foldable knife.

FIG. 1 illustrates an exploded view of an exemplary locking foldable knife 104. A locking foldable knife 104 will typically comprise a blade 108 having a first end 112 and a second end 116. In one or more embodiments, the first end 112 will typically comprise one or more cutting edges while the second end 116 typically comprises a shaped peripheral edge 196 for, among other things, locking the blade, as will be described further below.

Figure 2:
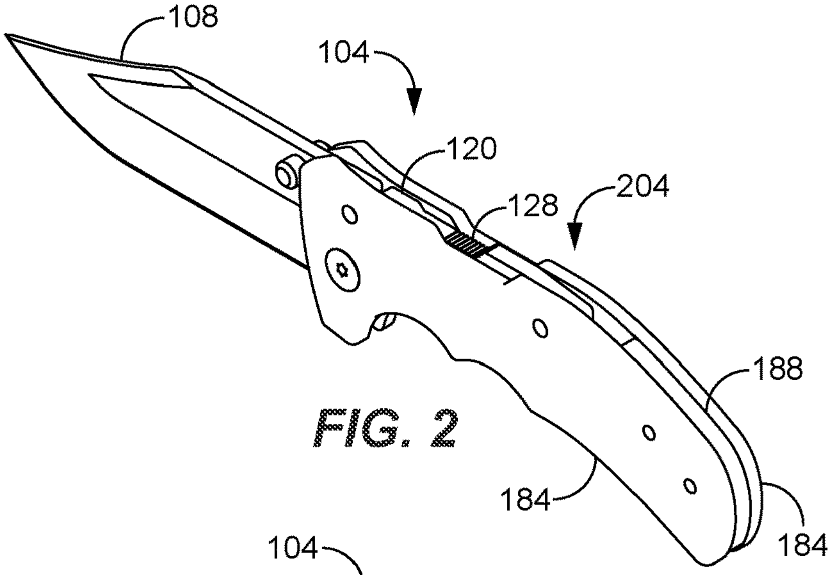
FIG. 2 is a perspective view of an exemplary locking foldable knife in an extended state.
Figure 3:
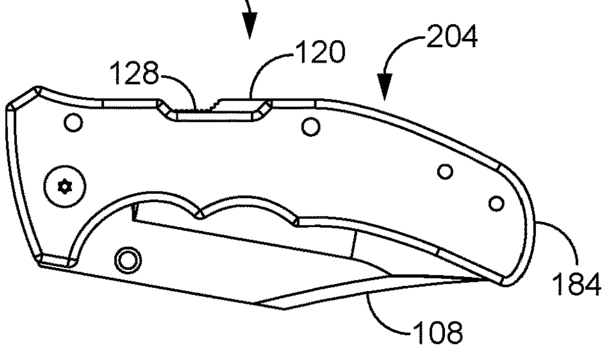
FIG. 3 is a side view of an exemplary locking foldable knife in a folded state.

Referring to FIGS. 2-3, it can be seen that the blade 108 may be secured to a handle 204 and extend and fold relative to the same. A handle 204 may comprise one or more portions 184, one or more handle spacers 188, or both. As shown in FIG. 1 for example, the handle 204 comprises a first and second portions 184 that form the lateral sides of the handle 204. It is noted that one or more portions of a handle 204 may be contoured, such as to form a hand grip, allow access to elements of the locking foldable knife 104, or both.

One or more fasteners 140 may be used to assemble the locking foldable knife 104. As shown in FIG. 1 for example, fasteners 140 comprising pins engage corresponding apertures 160 to assemble the locking foldable knife 104. Though shown as mechanical fasteners, it is contemplated that a fastener may also be one or more adhesives, welds, or the like.

A blade 108 may be rotatably secured to a handle 204 via one or more rotatable mounts. In one or more embodiments, a rotatable mount may comprise a pivot 152. As shown in FIG. 1 for example, a pivot 152 extends between one or more portions 184 of the handle 204 and through a hub 114 of the blade 108 to allow the blade to rotate at the pivot. It is noted that in FIG. 1, the pivot 152 extends through and is secured by one or more corresponding apertures 156 in the handle 204. One or more blade spacers 136 may be provided to facilitate rotation of the blade 108.

As stated above, the second end 116 of a blade 108 will typically comprise a shaped peripheral edge 196. The shaped peripheral edge 196 facilitates locking of the blade. In one or more embodiments, a shaped peripheral edge 196, or a portion thereof, will engage and disengage a locking bar 120 to lock or unlock a blade 108.

A shaped peripheral edge 196 may also comprise structural features that limit the extent to which a blade 108 may be extended, folded, or both. As will be described further below, a shaped peripheral edge 196 may engage an extension stop 180, a folding stop 144, or both, thereby preventing further extension or folding, respectively speaking. In one or more embodiments, an extension stop 180, folding stop 144, or both may be secured to one or more portions 184 of a handle 204, such as at one or more corresponding apertures 192, 164 thereof.

A locking bar 120 may comprise one or more guides 124 that, together with one or more mating guides 148, guide the movement of the locking bar. As shown in FIG. 1, the mating guide 148 is in the form of a pin that engages the guide 124, which is in the form of a slot, to control lateral movement of the locking bar 120. In the embodiment of FIG. 1, the mating guide 148 is secured to one or more portions 184 of the handle 204 at one or more corresponding apertures 168 thereof.

As stated, a locking bar 120 will typically be slidably mounted, such as within a handle 204 of a locking foldable knife 104. As can be seen in FIGS. 1 and 2, a handle spacer 188 provides lateral separation of the portions 184 of the handle 204, forming a compartment in the handle within which the locking bar 120 can slide. A user engagement portion 128, which may be textured, of the locking bar 120 is externally accessible to allow a user to engage and change the position of the locking bar.

A locking bar 120 will typically also comprise one or more biasing devices 132 to bias the locking bar toward a particular position, or both. As can be seen in FIG. 1, a biasing device 132 may comprise a spring or the like, which may be housed in a section, such as a cavity 194, of a locking bar 120. An anchor 172 may be provided to secure an end or other portion of a biasing device 132, thereby allowing the biasing device to apply a force relative to its secured portion.

As shown in FIG. 1, an anchor 172 secures a portion of the biasing device 132 to one or more portions 184 of a handle 204. In the embodiment of FIG. 1, the anchor 172 is a pin that is secured at one or more corresponding apertures 176 of one or more portions 184 of the handle 204. In one or more embodiments, the biasing device 132 applies a force that forces the locking bar 120 toward the blade 108, which biases the locking bar to an extended position.

Figure 4:
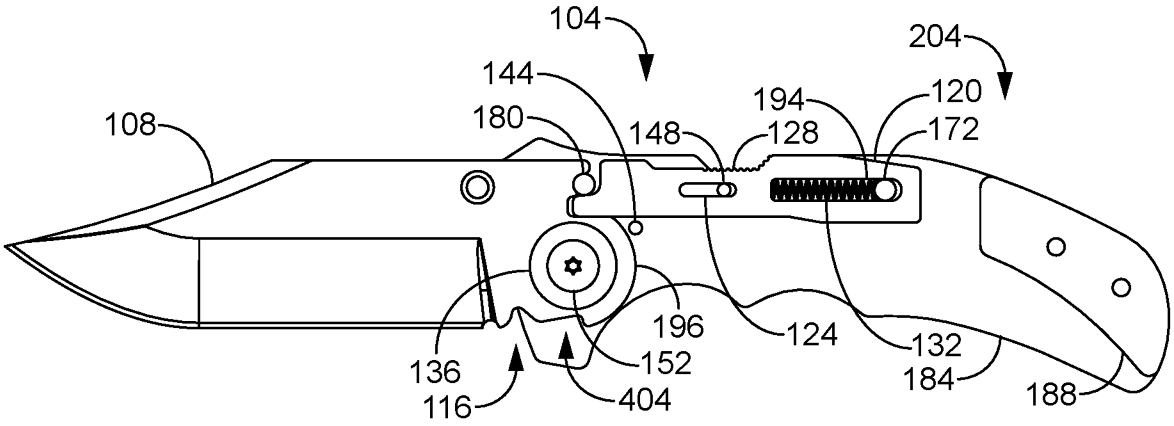
FIG. 4 is a side cross-sectional view of an exemplary locking foldable knife in a locked state.
Figure 5:
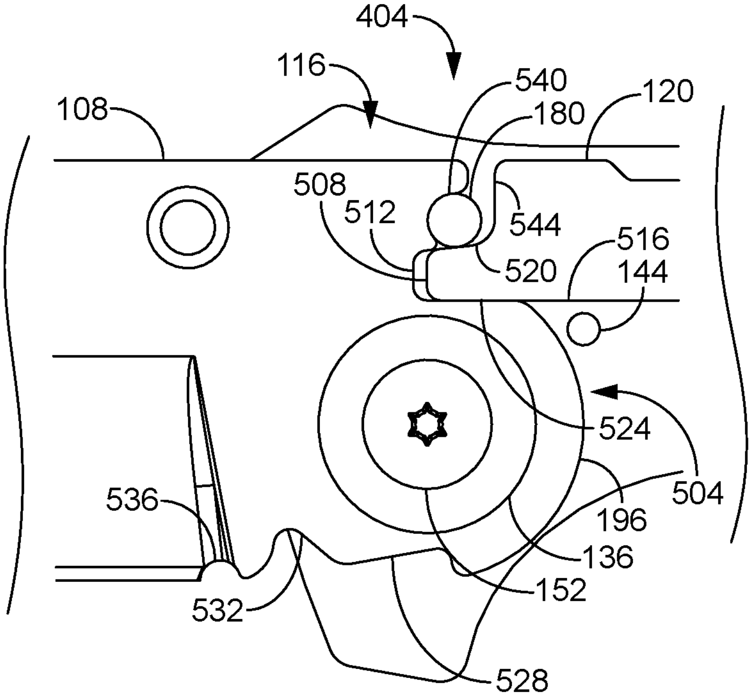
FIG. 5 is a side cross-sectional view of an exemplary locking assembly.
Figure 6:
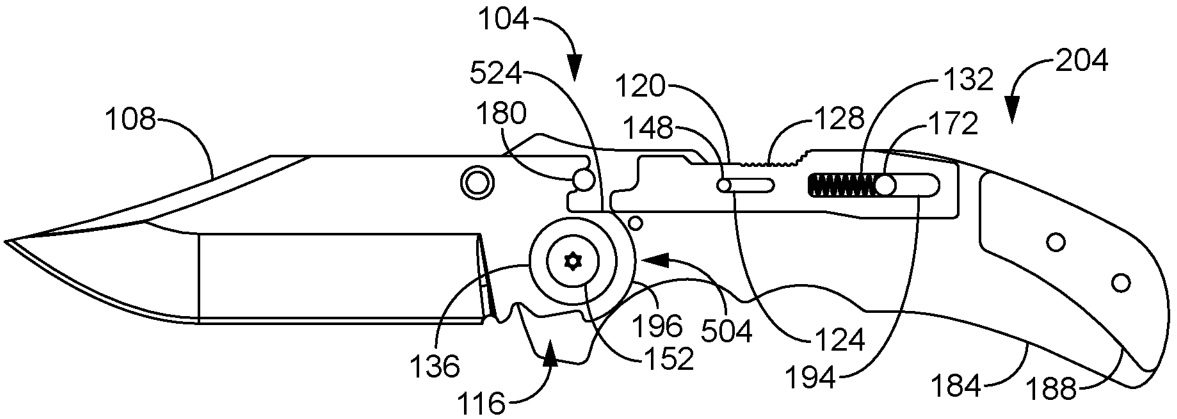
FIG. 6 is a side cross-sectional view of an exemplary locking foldable knife in an unlocked state.
Figure 7:
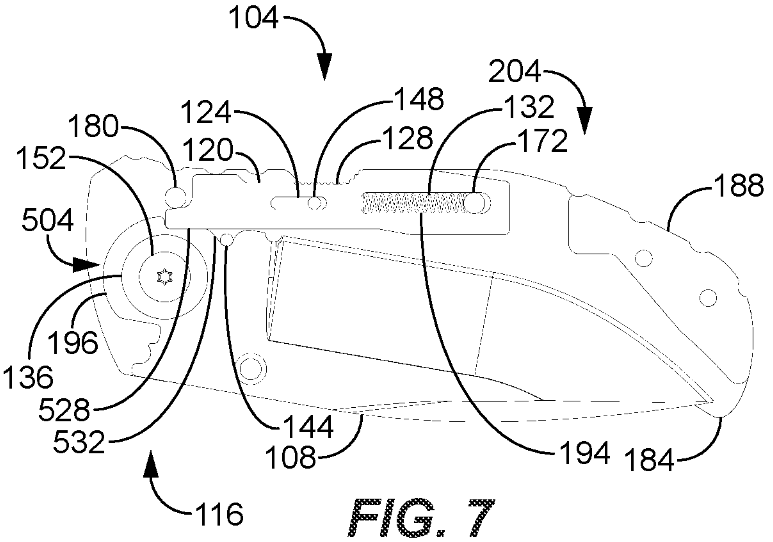
FIG. 7 is a side cross-sectional view of an exemplary locking foldable knife in a locked state.

Operation of a locking foldable knife 104 will now be described with respect to FIGS. 4-7, whereby FIGS. 4 and 5 illustrate the locking foldable knife 104 in a locked state while in an extended state, FIG. 6 illustrates the locking foldable knife in an unlocked state while in an extended state, and FIG. 7 illustrates the locking foldable knife in a locked stated while being folded. In the illustrated unlocked state of FIG. 6, the blade 108 is shown in an extended position; however, it will be understood from the disclosure herein that a locking foldable knife 104 may be unlocked while in its folded state to allow transition to an extended state.

A detailed view of the exemplary locking assembly 404 is shown in FIG. 5. As can be seen, the shaped peripheral edge 196 of a blade 108 may comprise one or more locking edges 524, 528, one or more interstitial edges 504, or both. In one or more embodiments, an interstitial edge 504 will be formed between two locking edges 524, 528. In general, a locking bar 120 will traverse an interstitial edge 504 as the locking foldable knife 104 is placed in its extended or folded states. One or more receiving edges 532, 540 may be provided as well to engage an extension stop 180, folding stop 144, or both to limit the extent of extension and folding that can occur.

A locking edge 524, 528 engages a locking bar 120 to lock a blade 108 in position, such as shown in FIGS. 4 and 5. In one or more embodiments, a locking edge 524, 528 may be shaped to conform to the locking edge 516 of a locking bar 120. These mating surface areas allow the blade 108 to be robustly locked in position with little or no movement once locked.

As can be seen, an interstitial edge 504 may be arcuate while one or more locking edges are substantially linear.

An outward extending tab 508 and corresponding slot 512 that receives the tab may be provided to further the reliability of the lock. A tab 508 and slot 512 may, respectively, be at a second end 116 of a blade 108 and a locking bar 120, or vice versa. As shown in FIG. 5 for example, a slot 512 is formed in the shaped peripheral edge 196 of the blade 108 at the second end 116 thereof, and a corresponding tab 508 is provided at a distal end 544 of the locking bar 120.

When locked, a tab 508 may be received in a slot 512 further adding to the surface area of engagement between a blade 108 and locking bar 120, increasing the robustness of the lock. The increased strength of the lock reduces the likelihood of lock failure, such as due to force applied on the blade 108 during use. As can be seen, a tab 508 and slot 512 may have conforming shapes to increase the surface area of engagement.

It is noted that a locking bar 120 may engage an extension stop 180 when extended. In one or more embodiments, this engagement limits the extension of the locking bar 120 and may be used to prevent a tab 508 or other portion of the locking bar from advancing into a slot 512 beyond a particular threshold. The locking bar 120 may be prevented from becoming lodged in the slot 512 in this manner.

FIGS. 4 and 5 also show that an extension stop 180 prevents the locking bar 120 from moving perpendicularly to the locking bar's longitudinal axis by engaging at least the distal end 544 of the locking bar when the locking bar is extended into a locked position. A portion 520 of the locking bar 120, namely its tab 508, may be received between an extension stop 180 and a locking edge 524, 528 of the blade 108, when locked. In this manner, the locking bar 120 is prevented from moving perpendicularly to its longitudinal axis and the blade 108 accordingly cannot be folded unless the locking bar 120 is retracted.

In FIG. 4, the locking bar 120 is in an extended position thereby locking the blade 108 in the extended state shown therein. The biasing device 132 applies a force to maintain the extended position of the locking bar 120. The force applied by a biasing device 132 may be overcome by a user to retract the locking bar 120. For example, in FIG. 6, the locking bar 120 is retracted to unlock the blade 108, compressing the biasing device 132.

When retracted, the locking bar 120 is disengaged from the locking edge 524, which unlocks the blade 108 and allows the blade to be rotated. The locking bar 120 may traverse the interstitial edge 504, in engagement or adjacent with the interstitial edge, as the blade 108 is rotated, such as to arrive at another locking edge 528 thereby locking the blade in a folded state, as shown in FIG. 7.

As can be seen, a locking bar 120 may be retracted to unlock the blade 108, to allow the blade 108 to move between the extended state and folded state. The locking bar 120 may then be extended to lock the blade 108 in the desired state.

Figure 8:
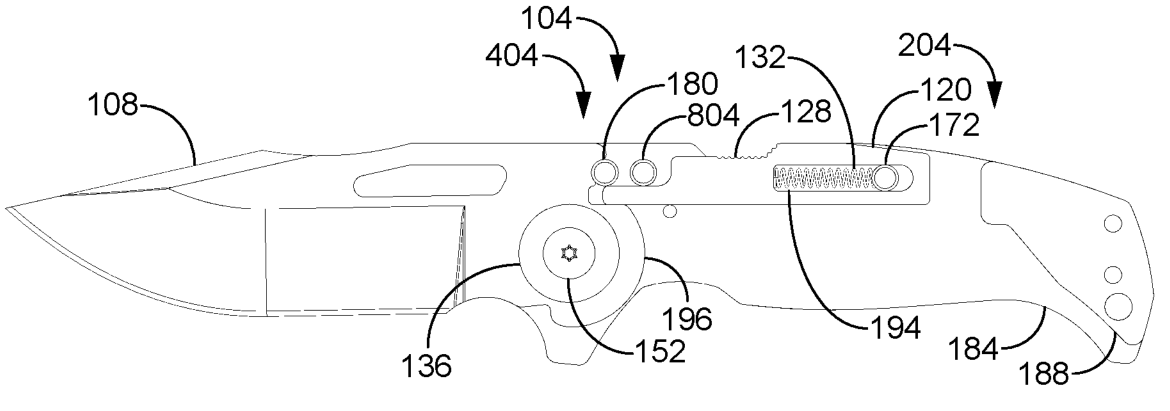
FIG. 8 is a side cross-sectional view of an exemplary locking foldable knife.

FIG. 8 illustrates an embodiment of a locking foldable knife 104 having a locking assembly 404 with an additional stop 804. An additional stop 804 reinforces the locking assembly 404 by providing additional structure to prevent the locking bar 120 from moving perpendicularly to its longitudinal axis, which reduces the likelihood of the blade 108 folding while locked. Similar to an extension stop 180, the additional stop 804 may engage a locking bar 120 when the locking bar is extended, limiting the extension of the locking bar.

Figure 9:
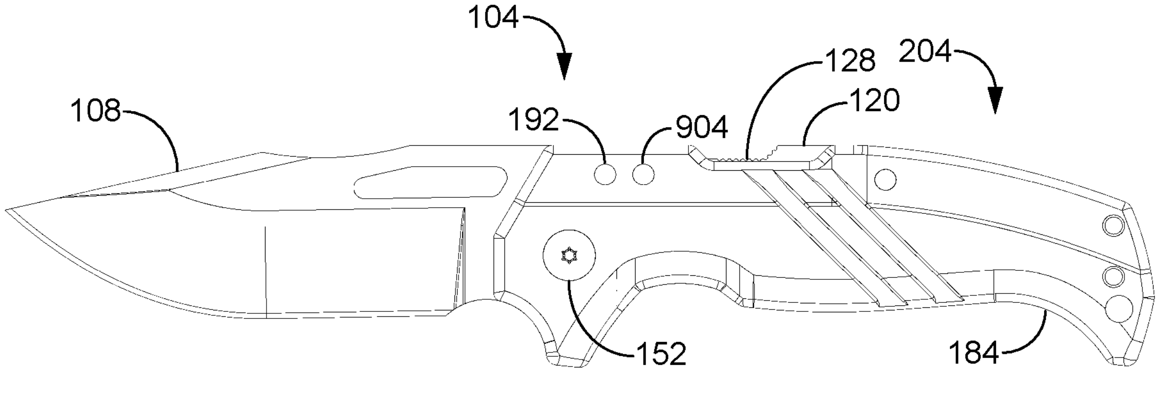
FIG. 9 is a side view of an exemplary locking foldable knife.

FIG. 9 illustrates a side view of such embodiment. As can be seen, an additional stop 804 may be secured to one or more apertures 904 of one or more portions 184 of a locking foldable knife's handle 204.

Figure 10:
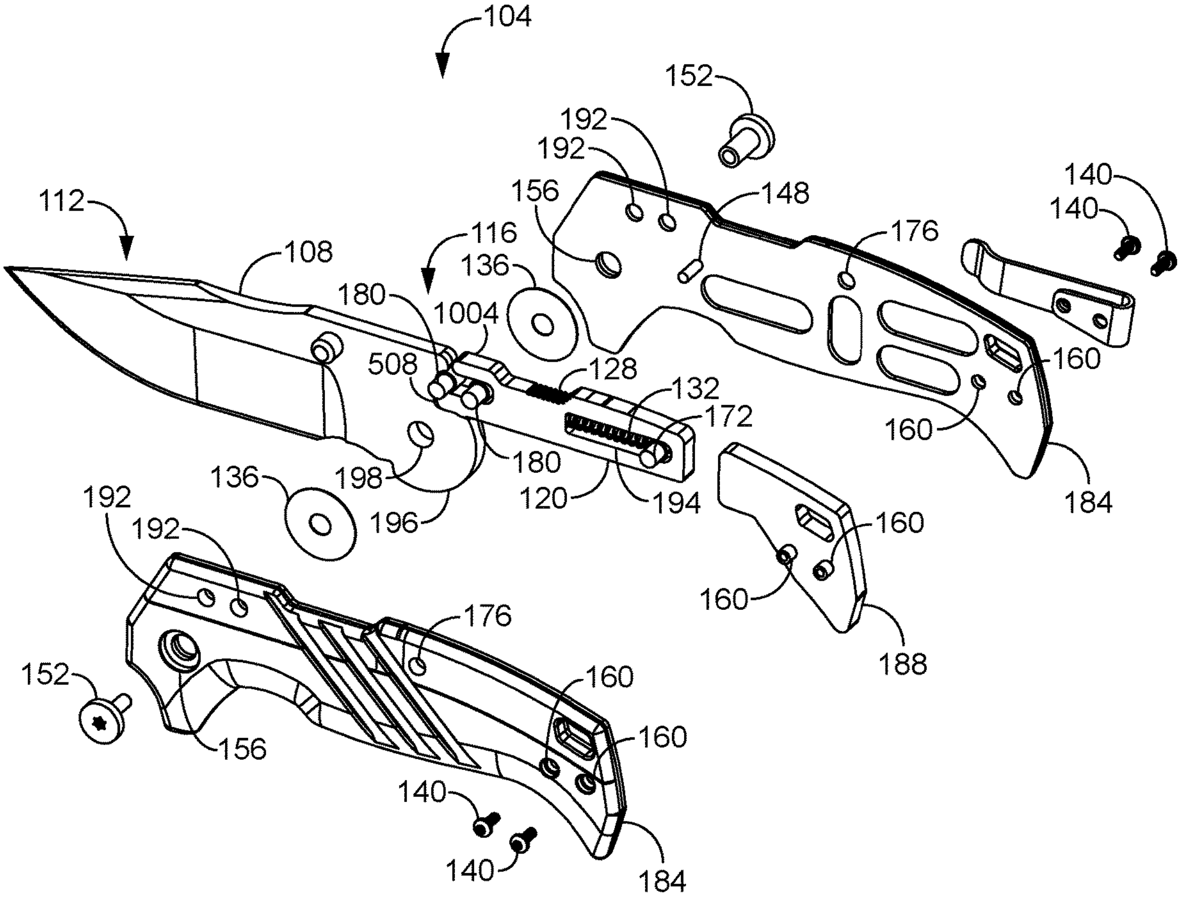
FIG. 10 is an exploded view of an exemplary locking foldable knife.
Figure 11:
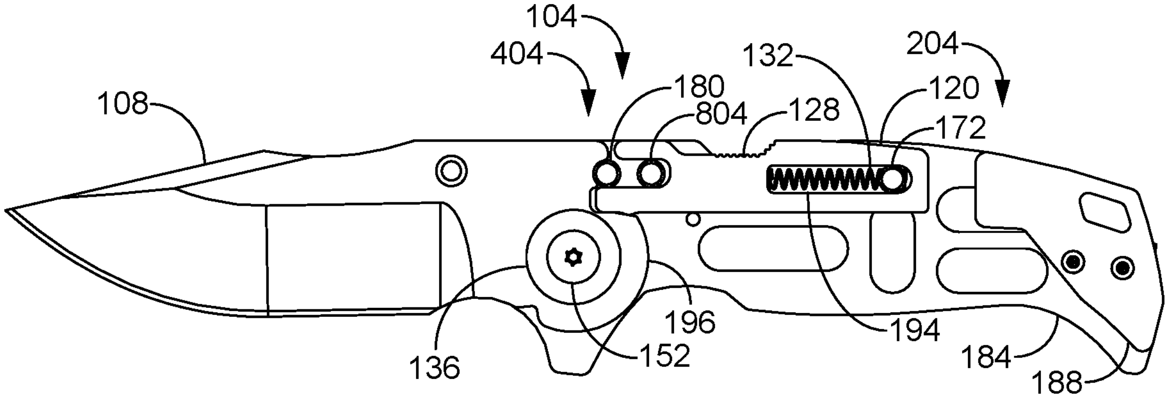
FIG. 11 is a side cross-sectional view of an exemplary locking foldable knife in an extended state.
Figure 12:
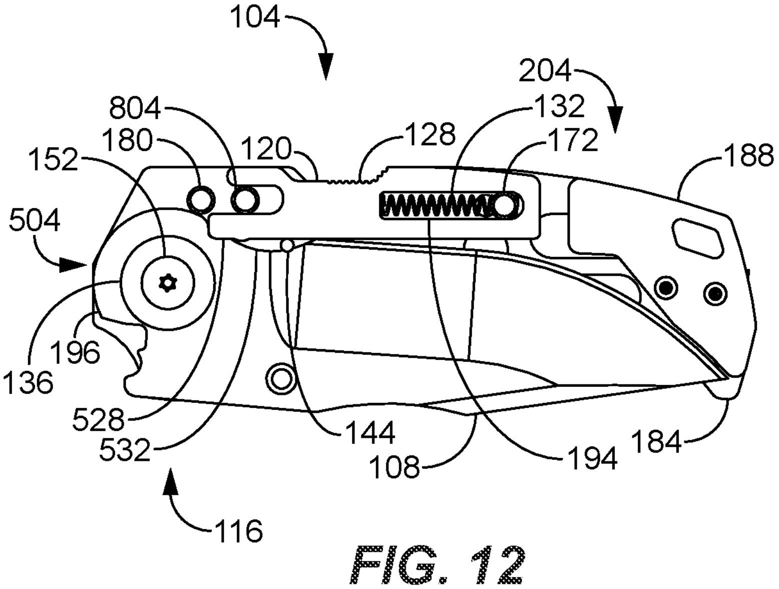
FIG. 12 is a side cross-sectional view of an exemplary locking foldable knife in a folded state.

FIGS. 10-14 illustrate an embodiment of a locking foldable knife 104 having a locking assembly 404 with an additional stop 804 as well as an additional tab 1004. It is noted that various combinations of one or more stops 180, 804 and one or more tabs 508, 1004 may be provided in different embodiments of the locking foldable knife 104. FIGS. 11 and 12 illustrate the locking foldable knife 104 in a locked state, with FIG. 11 illustrating an extended state and FIG. 12 illustrating a folded state.

Similar to an additional stop, an additional tab 1004 reinforces the locking assembly 404 by providing additional structure to prevent lock failure. As can be seen in FIG. 10, the additional tab 1004 may engage a proximal portion of a blade 108, one or more stops 180, 804, or both to further prevent the blade from becoming overextended.

Figure 13:
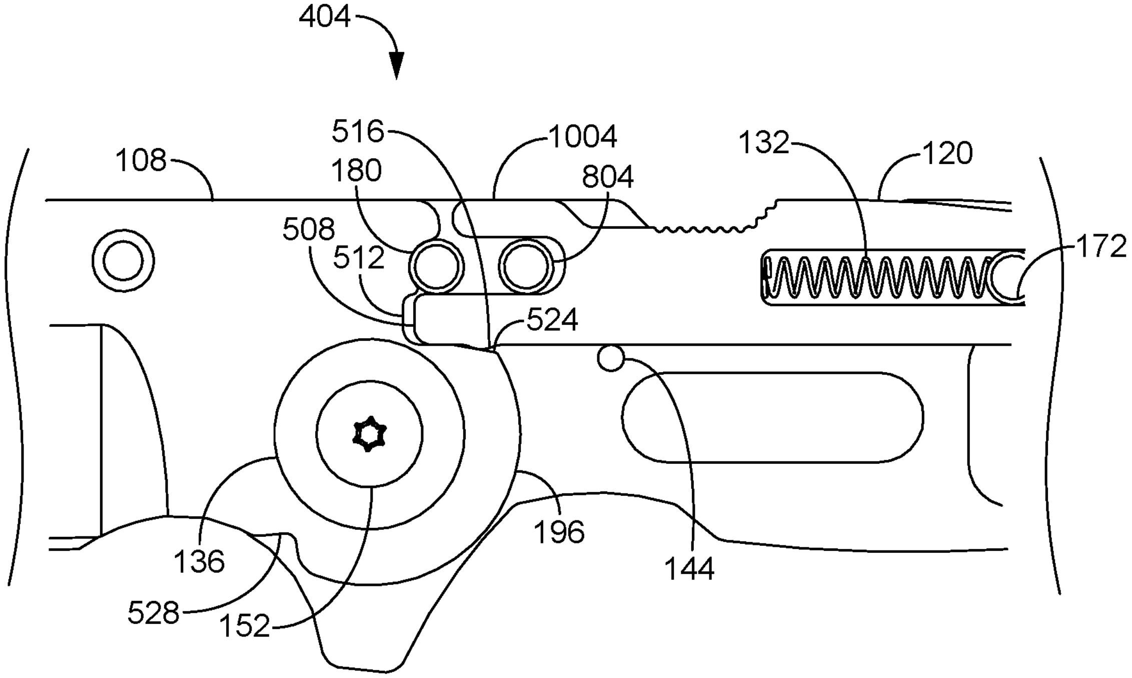
FIG. 13 is a side cross-sectional view of an exemplary locking assembly.
Figure 14:
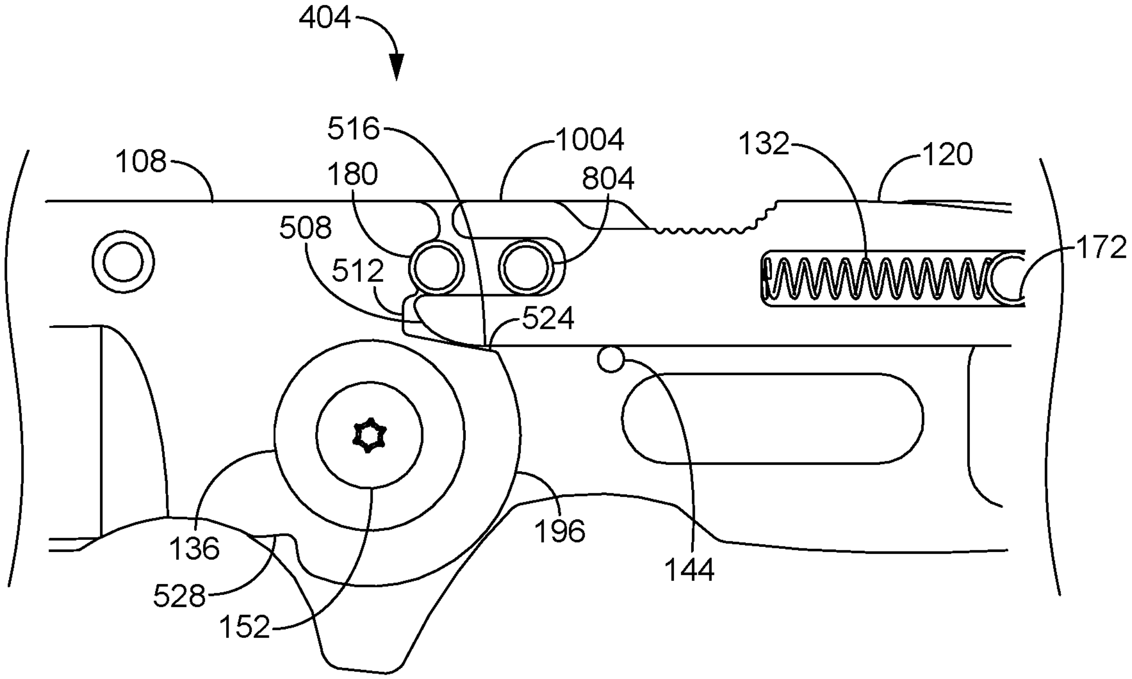
FIG. 14 is a side cross-sectional view of an exemplary locking assembly.

It is noted that a locking bar 120, a shaped peripheral edge 196, or both may have various shapes. As shown in the detailed views of FIGS. 13 and 14 for example, a locking edge 516 of a locking bar 120 may comprise one or more contoured portions. FIG. 13 illustrates an exemplary embodiment having an outwardly extending protrusion in the locking edge 516, while FIG. 14 illustrates an exemplary embodiment having a curved locking edge. A locking edge 524 of a shaped peripheral edge 196 may be shaped to accommodate the same. As can be seen in FIGS. 13 and 14, a locking edge 524 of a shaped peripheral edge 196 may be angled to engage a locking edge 516 of a locking bar 120.

Figure 15:
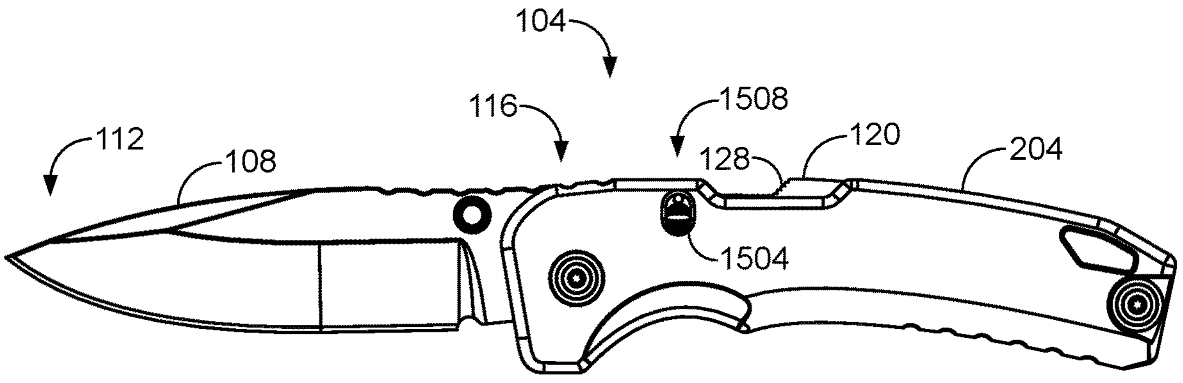
FIG. 15 is a side view of an exemplary locking foldable knife.

FIG. 15 illustrates an embodiment of a locking foldable knife 104 having a switched locking assembly or switch lock 1508 that may be engaged and disengaged via a switch 1504. As will be described further below, the switch lock 1508 provides another locking mechanism for locking the blade 108 in an extended or folded state. In this manner, the locking foldable knife 104 may be doubly locked.

Figure 16:
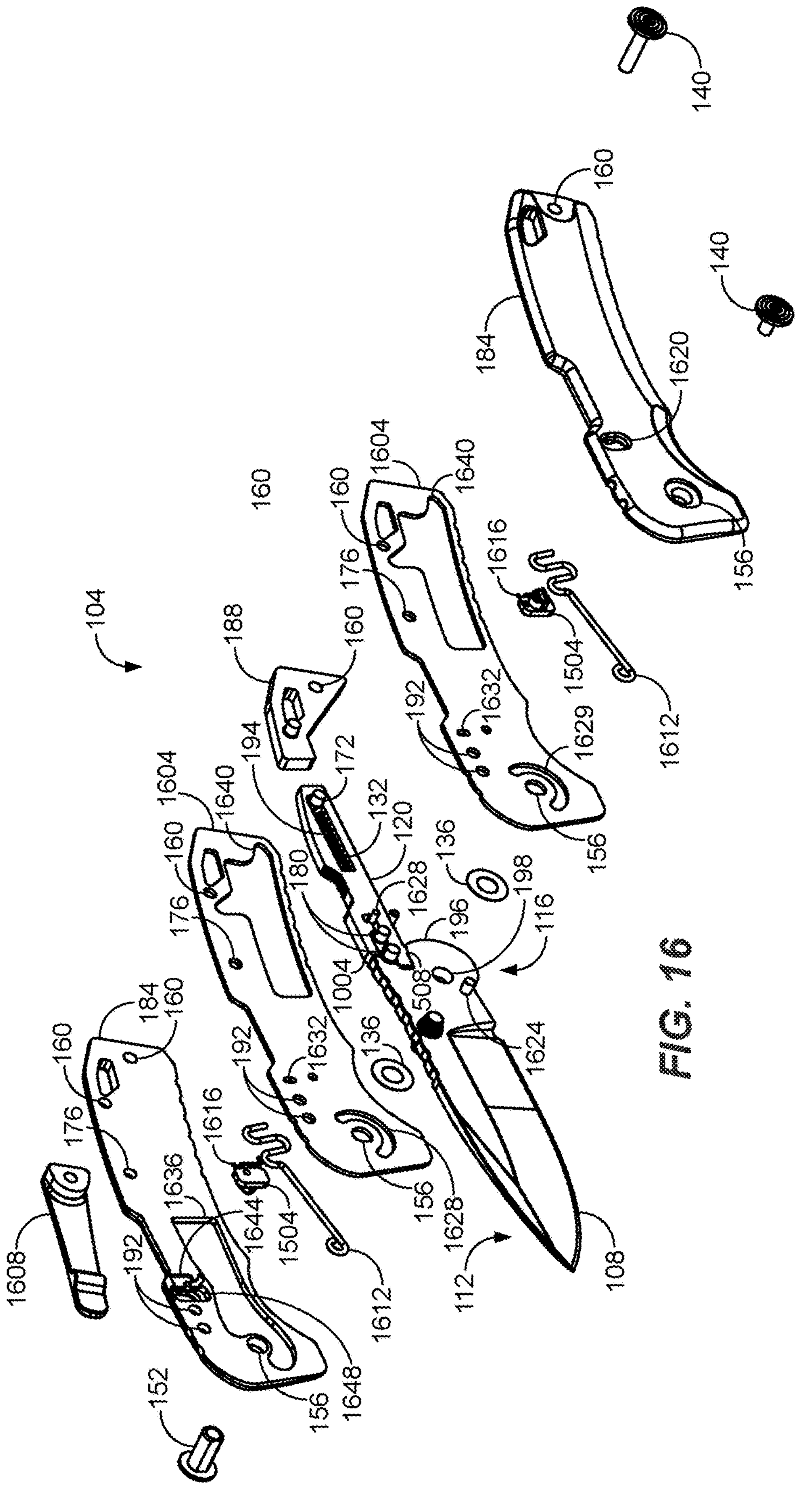
FIG. 16 is an exploded view of an exemplary locking foldable knife.

Referring to the exploded view of FIG. 16, it can be seen that the locking foldable knife 104 with a switched locking assembly may have one or more extension stops 180 that operate in conjunction with a locking bar 120 such as in the previously described embodiments. In the embodiment of FIG. 16, a plurality of extension stops 180 are provided, which correspond to the extension stop and additional stop described above with respect to FIG. 8.

It will be understood that though shown as being symmetrical sets of components at each of its lateral sides, a locking foldable knife 104 may only have a single set of components at one side in some embodiments.

A locking foldable knife 104 may comprise one or more liners 1604 that may be disposed adjacent one or more portions 184 of its handle. In one or more embodiments, a blade 108 and locking bar 120 and other componentry may be located between a plurality of liners 1604, such as illustrated in the exemplary embodiment of FIG. 16.

A liner 1604 may provide a surface that permits rotation or other movement of the components of a locking foldable knife 104, such as rotation of a blade 108 and movement of a locking bar 120. For example, a liner 1604 may have a friction reducing surface in one or more embodiments.

A liner 1604 may also include one or more apertures 156, 160, 192, 176 to receive various components as described above. In one or more embodiments, an aperture 1632 to receive a portion of a switch 1504, such as a member 1628 thereof, may be provided. Such aperture 1632 may be elongated to allow movement of the switch 1504 between a locked and unlocked state, as will be described further below.

In addition, various cavities 1629, 1640 may be formed in a liner 1604 as well. For example, an arcuate cavity 1629 may receive a post 1624 of a blade 108 with the arcuate shape allowing the post to travel along a curved path therein as the blade is rotated. In addition to receiving one or more components, a cavity 1640 may also provide a relief in some embodiments, such as to reduce material usage, weight, or both.

A lateral portion 184 of a locking foldable knife's handle may include one or more cavities 1636, 1644, 1648 for receiving various other components as well. As can be seen, a portion 184 of a handle may include a biasing device cavity 1636 may be provided to receive a biasing device 1612 for assisting the extension, folding, or both of a blade 108. Such cavity 1636 may be shaped to allow movement of the biasing device therein as a blade 108 is rotated. As will be described further below, a cavity 1636 may comprise a generally rectangular portion with an arcuate extension which allows a biasing device 1612 to follow the rotational movement of a blade when the blade is rotated.

One or more cavities 1644, 1648 may be provided for receiving a switch 1504 and its hold 1616. For example, a first cavity 1648 may receive a switch 1504 while a second cavity 1644 receives a hold 1616. As will be described further below, the switch 1504 will typically be movable within a cavity 1648 between one or more predefined positions, such as between a locked and unlocked position.

A hold 1616 may be provided to releasably secure a switch 1504 in one or more predefined positions. Though identified as individual cavities 1644, 1648, it will be understood that a single cavity may be provided in various embodiments of the locking foldable knife 104.

A portion 184 of a handle may also include an aperture 1620 at an exterior facing portion of one or more cavities 1648 to allow a user to engage a switch 1504 to lock and unlock the switch lock. One or more clips 1608 may also be mounted to at a portion 184 of a handle.

Figure 17:
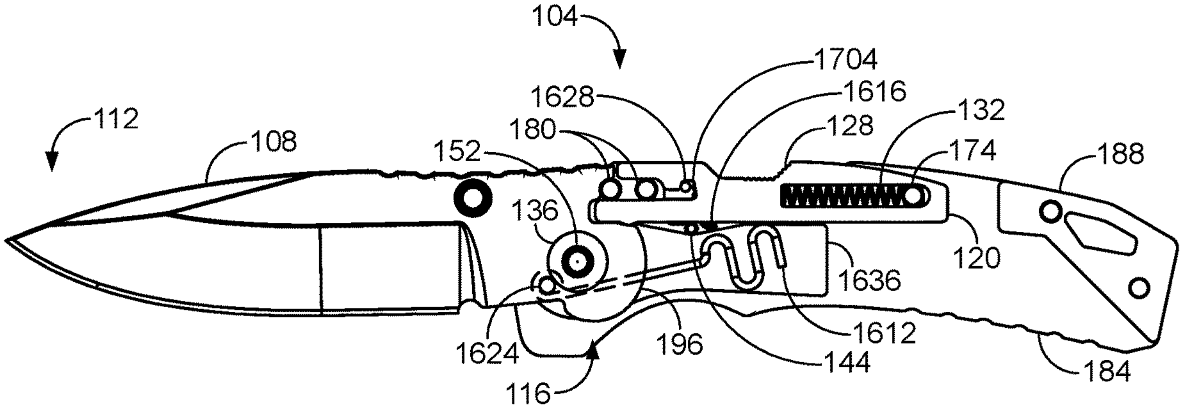
FIG. 17 is a side cross-sectional view of an exemplary locking foldable knife in a switch locked state.
Figure 18:
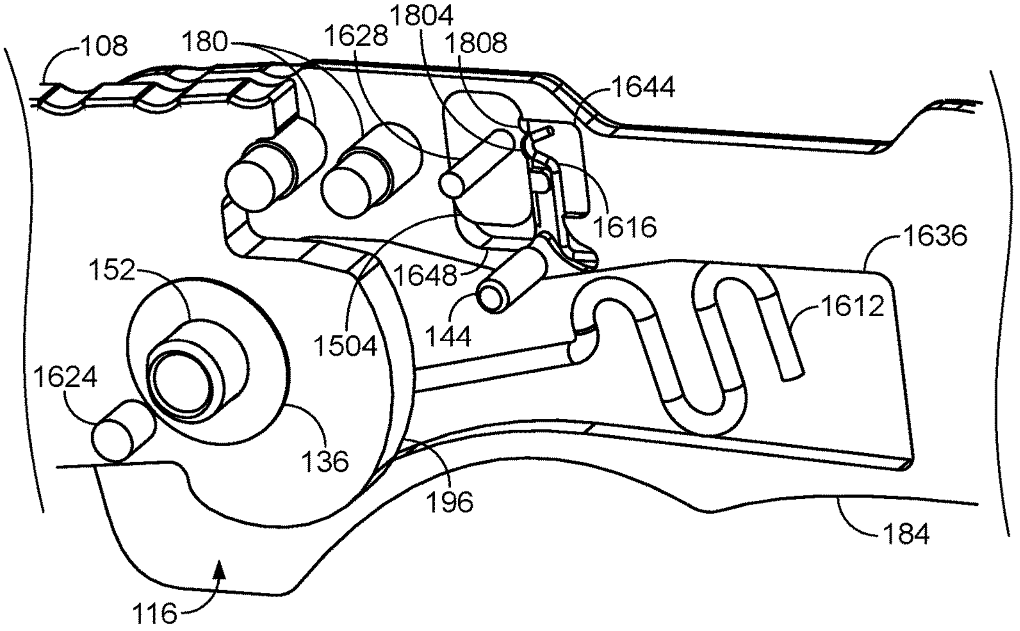
FIG. 18 is a side cross-sectional view of an exemplary locking assembly.

FIGS. 17 and 18 illustrate a locking foldable knife 104 in a switch locked state. It is noted that a locking bar has not been shown in FIG. 18 to better reveal operation of a switch lock's components.

As can be seen, a member 1628 of a switch 1504 may be received within a notched portion 1704 of a locking bar 120 when in the switch locked state. This prevents movement, in this case retraction, of the locking bar 120 thereby securing the locking bar in position. In this manner, the locking bar 120 and blade 108 are doubly locked in that the locking bar and blade are in a locked state relative to the extension stops 180 while the locking bar is also locked in position by the switch 1504 via its member 1628. The locking foldable knife 104 is thus prevented from transitioning to another state such as by inadvertent operation by a user in addition state transitions caused by mechanical failure.

A switch 1504 may be held in position by a hold 1616 as stated above. As can be seen from FIG. 18, a hold 1616 may engage a switch 1504 to hold the switch in a particular position. In the embodiment of FIG. 18 for instance, the hold 1616 engages a first detent 1804 of the switch 1504 to hold the switch in a locked position, with a second detent 1808 provided to hold the switch in an unlocked position.

It is contemplated that a hold 1616 may be a flexible resilient structure, such as a spring, to allow a switch 1504 to be moved between one or more positions. A hold 1616 may deflect for example when a user moves a switch 1504 and be biased to return toward its previous configuration once the switch achieves a predefined position, such its locked or unlocked position. This allows a hold 1616 to engage various detents 1804 to hold a switch 1504 in various corresponding positions.

As can be seen, a cavity 1644 for the hold 1616 may be shaped to receive and retain the hold while also permitting the hold to deflect therein. Likewise, a cavity 1648 for a switch 1504 may be shaped to permit movement of the switch between a locked and unlocked position. A cavity 1648 may also guide the movement of a switch 1504 in one or more embodiments. As shown in the embodiment of FIG. 18 for example, the switch 1504 may move linearly within the confines of the cavity 1648.

Figure 19:
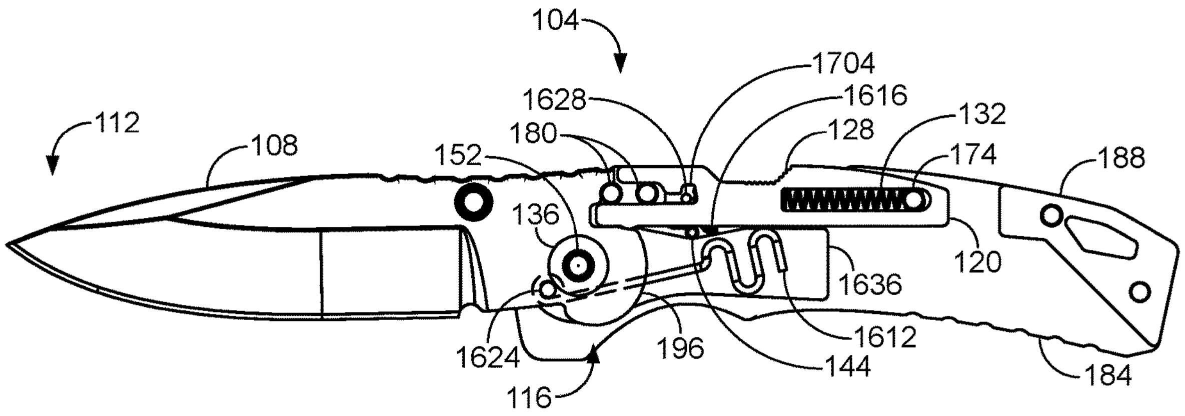
FIG. 19 is a side cross-sectional view of an exemplary locking foldable knife in a switch unlocked state.
Figure 20:
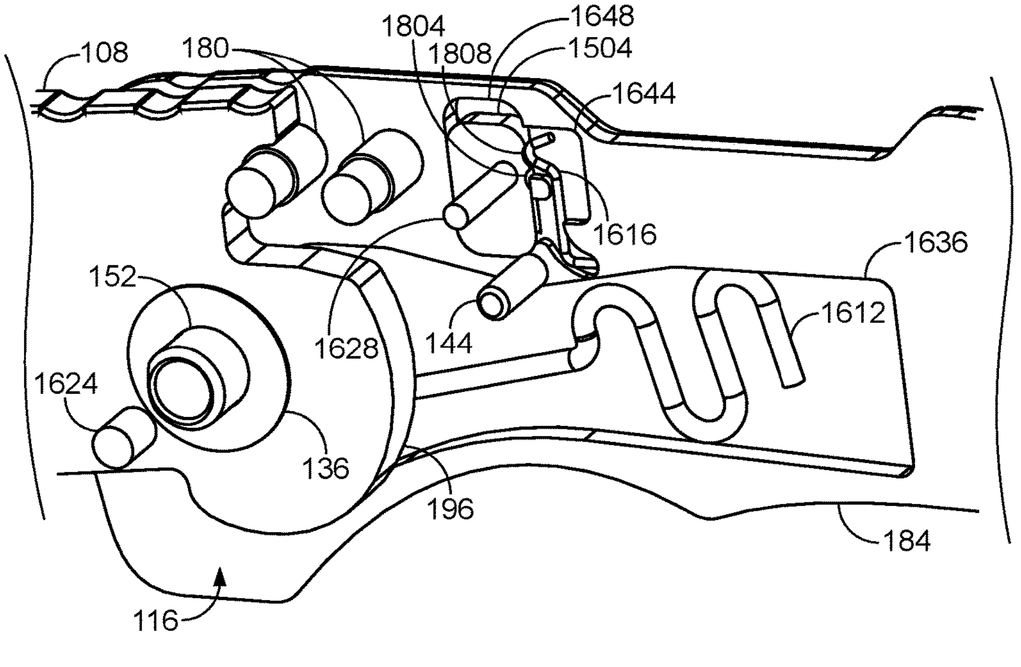
FIG. 20 is a side cross-sectional view of an exemplary locking assembly.

FIGS. 19 and 20 illustrate a locking foldable knife 104 in a switch unlocked state in which a locking bar is not shown in FIG. 20 to better reveal operation of a switch lock's components. As can be seen, a member 1628 of a switch 1504 may be moved to disengage a notched portion 1704 of a locking bar 120 when in the switch unlocked state. It can be seen that the switch 1504 and member 1628 have been moved downward within the cavity 1648 and may be held in this unlocked position by engagement of its second detent 1808 by a hold 1616.

Figure 21:
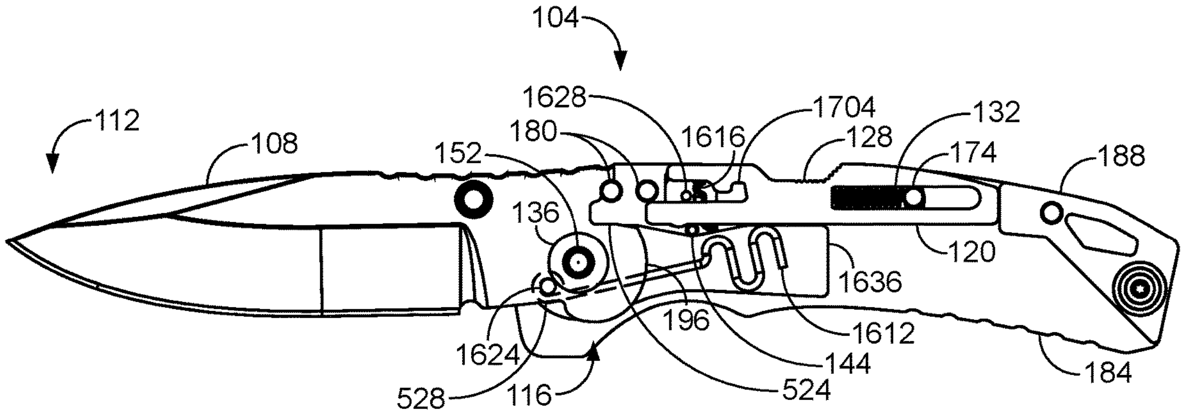
FIG. 21 is a side cross-sectional view of an exemplary locking foldable knife in an unlocked state.

In the switch unlocked state, movement of the locking bar 120 is no longer prevented by the switch lock as the switch 1504 no longer engages the notched portion 1704 of the locking bar. The locking bar 120 can then be moved to an unlocked position as shown in FIG. 21 whereby the locking bar is retracted, overcoming the force of the biasing device 132 and disengaging the locking bar from the stop 180 as well as a locking edge 524 of the blade's shaped peripheral edge 196.

Figure 22:
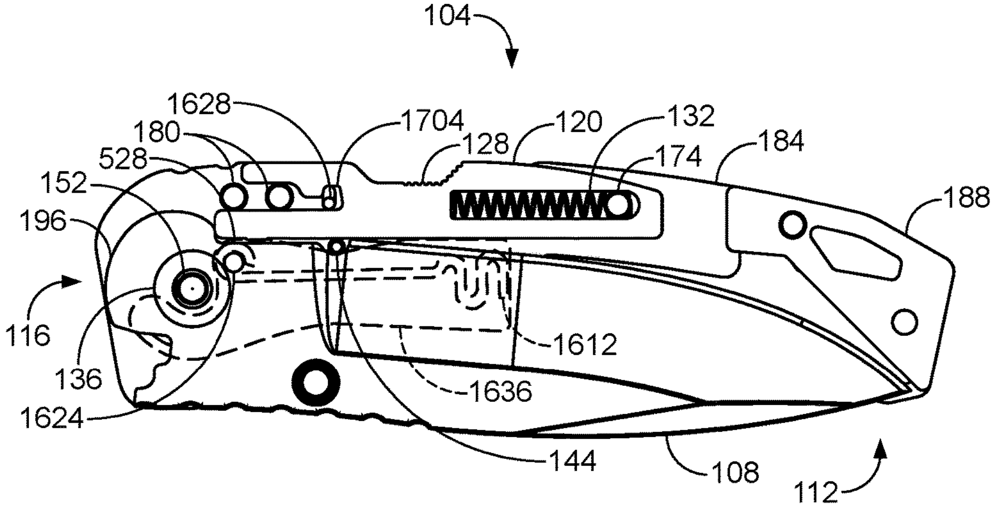
FIG. 22 is a side cross-sectional view of an exemplary locking foldable knife in a folded state.

As such, the switch 1504 is unlocked and the locking bar 120 is retracted allowing rotation of the blade 108 such as to the folded state illustrated in FIG. 22. As described above, once in a folded state the locking bar 120 may once again extend to engage one or more extension stops 180 and a locking edge 528 of the shaped peripheral edge 196 to lock the locking foldable knife 104 in a folded state.

Similar to the extended state of FIGS. 17 and 18, a folded state may be doubly locked as well. To illustrate, once in a folded state, a switch 1504 and a member 1628 thereof may be moved to a locked position whereby the member engages a notched portion 1704 of a locking bar 120, such as shown in FIG. 17. Prevention of movement, in this case retraction, of the locking bar 120 secures the locking bar in its locked position thereby preventing the locking foldable knife 104 from transitioning from the folded state such as by mechanical failure, inadvertent user operation or both. When use is desired, a switch 1504 may then be moved back to an unlocked position to allow the blade 108 of a locking foldable knife 104 to be unfolded into an extended state, such as described above.

As alluded to above, a locking foldable knife 104 may provide assisted extension, folding, or both in one or more embodiments, such a via one or more biasing devices 1612. Relative to FIGS. 19 and 22, it can be seen that the biasing device 1612, which may be a spring, may be distorted when a locking foldable knife 104 is in a folded state. In FIG. 22 for example, the biasing device 1612 is compressed by engagement with a post 1624 of the blade 108 and a wall of its cavity 1636. The biasing device 1612 thus applies a force which assists in rotating the blade 108 as the blade is rotated toward an extended position.

A biasing device 1612 may also be distorted when the locking foldable knife 104 is in an extended state. Referring to FIG. 19 for example, a biasing device 1612 may be stretched between a post 1624 of a blade 108 and a portion of its cavity 1636. In the embodiment of FIG. 19, the cavity 1636 comprises a narrowed portion that catches a portion of the biasing device 1612 causing the biasing device to stretch as the post 1624 is moved during extension of the blade 108. As such, a biasing device 1612 may also or alternatively apply a force which assists in rotating a blade 108 toward a folded position as the biasing device 1612 returns toward an undistorted configuration.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A locking foldable knife comprising:

a blade having a first end and a second end, wherein the first end comprises one or more cutting edges and the second end comprises a shaped periphery, the shaped periphery comprising a plurality of locking edges and at least one interstitial edge therebetween;

a handle, wherein the blade is rotatably mounted to the handle at its second end;

a stop secured to the handle;

a locking bar comprising a notched portion and being movable along an axis between an extended position and a retracted position, wherein a portion of the locking bar at a distal end of the locking bar is received between at least one of the plurality of locking edges and the stop when the locking bar is in the extended position, wherein the locking bar is disengaged from the plurality of locking edges when the locking bar is in the retracted position; and a lock movable between a locked position and an unlocked position relative to the locking bar, wherein a portion of the lock is received within the notched portion when the lock is in the locked position, wherein the lock is disengaged from the notched portion when the lock is in the unlocked position.

2. The locking foldable knife of claim 1, further comprising a hold that engages the lock at a first location when the lock is in the locked position and engages the lock at a second location when the lock is in the unlocked position.

3. The locking foldable knife of claim 2, wherein the lock comprises a first detent at the first location and a second detent at the second location.

4. The locking foldable knife of claim 3, wherein the hold comprises a resilient member biased to engage the first detent when the lock is in the locked position and the second detent when the lock is in the unlocked position.

5. The locking foldable knife of claim 1, wherein the notched portion extends substantially perpendicular to the axis.

6. The locking foldable knife of claim 1, wherein the lock is movable substantially perpendicular to the axis.

7. The locking foldable knife of claim 1, wherein the lock comprises:

a user engageable switch at an exterior surface of the handle; and a member extending inwardly from the exterior surface.

8. A locking assembly for a foldable knife comprising a handle and a blade, the locking assembly comprising:

one or more stops secured to the handle;

a locking bar comprising a notched portion and being movable along an axis between an extended position and a retracted position relative to the handle, wherein the locking bar engages a portion of the blade and the one or more stops when the locking bar is in the extended position, wherein the locking bar is disengaged from at least one of the one or more stops when the locking bar is in the retracted position; and a lock movable between a locked position and an unlocked position relative to the locking bar, wherein a portion of the lock is received within the notched portion when the lock is in the locked position, wherein the lock is disengaged from the notched portion when the lock is in the unlocked position.

9. The locking assembly of claim 8, further comprising a hold that engages the lock at a first location when the lock is in the locked position and engages the lock at a second location when the lock is in the unlocked position.

10. The locking assembly of claim 9, wherein the lock comprises a first detent at the first location and a second detent at the second location.

11. The locking assembly of claim 10, wherein the hold comprises a resilient member biased to engage the first detent when the lock is in the locked position and the second detent when the lock is in the unlocked position.

12. The locking assembly of claim 8, wherein the notched portion extends substantially perpendicular to the axis.

13. The locking assembly of claim 8, wherein the lock is movable substantially perpendicular to the axis.

14. The locking assembly of claim 8, wherein the lock comprises a user engageable switch at an exterior surface of the handle and a member extending inwardly from the exterior surface.

15. A locking foldable knife comprising:

a handle having a stop;

a blade having an end rotatably mounted to the handle, the end of the blade defining locking edges;

a locking bar being movable on the handle along an axis between an extended position and a retracted position relative to the stop of the handle and the end of the blade, the locking bar having a distal end and defining a notch, the distal end of the locking bar being engaged between one of the locking edges and the stop in response to the locking bar being in the extended position, the distal end of the locking bar being disengaged from the locking edges in response to the locking bar being in the retracted position; and a lock being movable on the handle between a locked position and an unlocked position relative to the locking bar, the lock being engaged with the notch in response to the locking bar being in the extended position and the lock being in the locked position, the lock being disengaged from the notch at least in response to the lock being in the unlocked position.

16. The locking foldable knife of claim 15, wherein the lock in the locked position engaged with the notch is configured to prevent the locking bar from moving from the extended position to the retracted position.

17. The locking foldable knife of claim 15, wherein the locking bar defines an angled surface adjacent to the notch, the angled surface moving the lock from the locked position toward the unlocked position in response to the locking bar being moved from the retracted position to the extended position toward the lock in the locked position.

18. The locking foldable knife of claim 15, further comprising a resilient member being biased to engage a first detent of the lock in response to the lock being in the locked position and being biased to engage a second detent of the lock in response to the lock being in the unlocked position.

19. The locking foldable knife of claim 15, wherein the lock comprises:

a switch being exposed at an exterior surface of the handle and being user engageable; and a member extending inwardly from the switch and being engageable with the notch.

20. The locking foldable knife of claim 15, wherein the distal end of the locking bar is engaged between a first of the locking edges and the stop in response to the locking bar being in the extended position and the blade being rotated to a folded condition on the handle; and wherein the distal end of the locking bar is engaged between a second of the locking edges and the stop in response to the locking bar being in the extended position and the blade being rotated to a unfolded condition on the handle.

* * * * *